Jan. 24, 1956   N. DEMOSTHENES   2,732,200
VEHICLE OPERATED DOOR MECHANISM
Filed Dec. 29, 1952   3 Sheets-Sheet 1
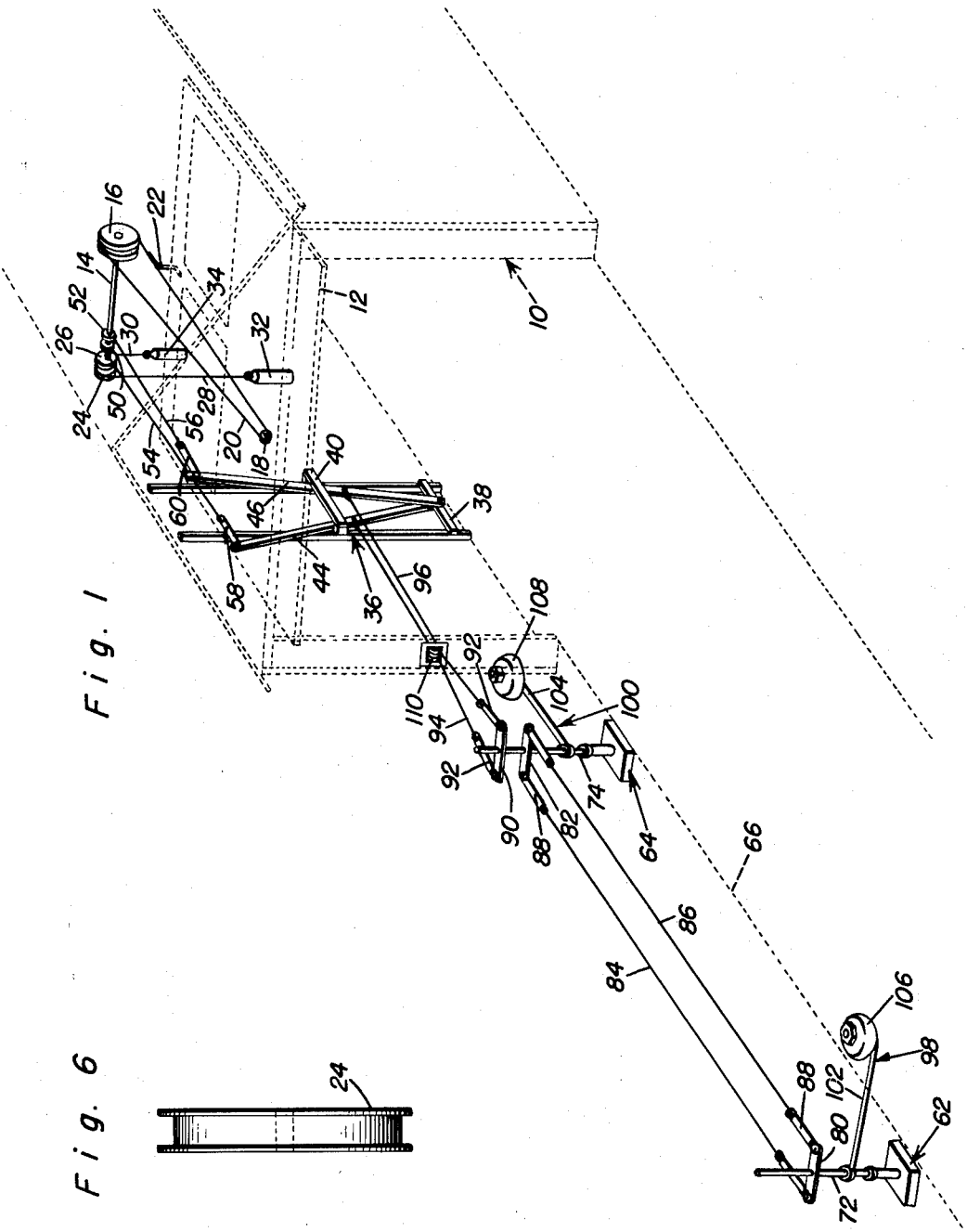
Nicholas Demosthenes
INVENTOR.

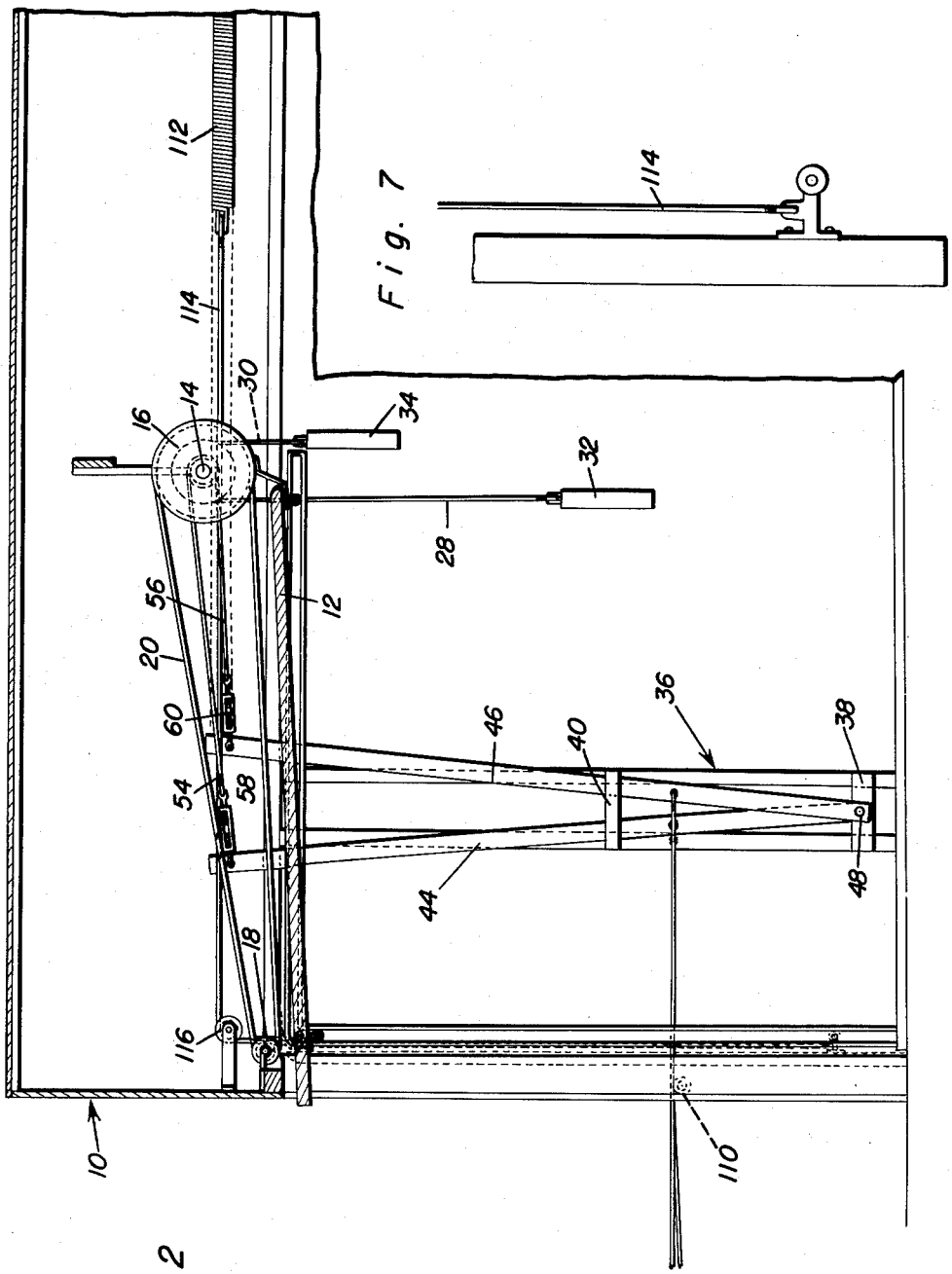

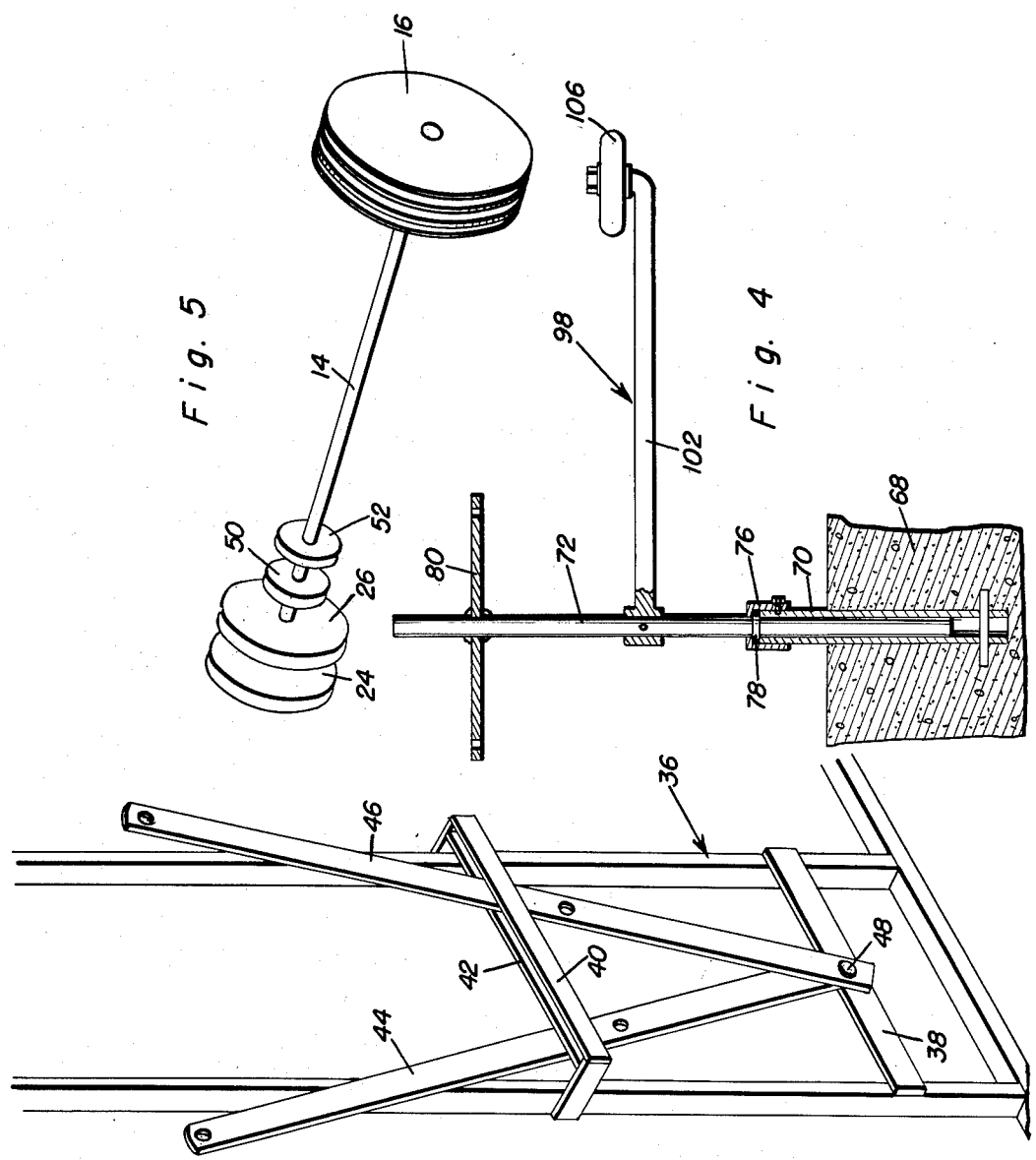

United States Patent Office 2,732,200
Patented Jan. 24, 1956

2,732,200

VEHICLE OPERATED DOOR MECHANISM

Nicholas Demosthenes, Savannah, Ga.

Application December 29, 1952, Serial No. 328,395

7 Claims. (Cl. 268—58)

This invention relates to new and useful improvements in overhead door structures and the primary object of the present invention is to provide a vehicle bumper actuating means operatively connected to a sliding overhead garage door whereby the door may be moved to an open or closed position by a vehicle approaching or leaving an overhead garage structure.

Another important object of the present invention is to provide a vehicle operated door mechanism for overhead garage doors including forward and rear bumper engaging members which are operatively connected to a counterweight shaft for the sliding overhead door so that as one of the bumper engaging members is engaged by a vehicle, the door will be opened and as the other bumper engaging member is engaged by a vehicle, the door will be closed.

A further object of the present invention is to provide a bumper actuated door raising and closing mechanism that will be actuated by a vehicle without the driver having to leave the vehicle in order to either open or close a sliding overhead garage door.

A still further aim of the present invention is to provide a vehicle operated mechanism of the aforementioned character that is extremely simple and practical in construction, strong and reliable in use, efficient and durable in operation, and inexpensive to manufacture, service and install, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a diagrammatic perspective view showing the present invention operatively connected to an overhead garage structure, the garage structure being shown in dotted lines;

Figure 2 is a fragmentary longitudinal vertical sectional view of an overhead garage structure and showing parts of the invention operatively connected to the sliding overhead door;

Figure 3 is a fragmentary perspective view of the combined support and guide member used in the invention;

Figure 4 is a fragmentary vertical sectional view of one of the pedestals and showing a bumper engaging member associated therewith;

Figure 5 is a perspective view of the counterweight shaft employed in conjunction with the present invention;

Figure 6 is a front elevational view of one of the cable engaging pulleys which are attached to the counterweight shaft; and, Figure 7 is a fragmentary plan view of Figure 2 to illustrate the manner in which a spring means of the overhanging door is operatively connected to the door.

Referring now to the drawings in detail, wherein for the purpose of illustration, there is disclosed a preferred embodiment of the present invention, the numeral 10 represents an overhead garage structure including a sliding overhead door 12 and a counterweight shaft 14 operatively connected to the door raising position and a door closing position. The shaft 14 is supported in a horizontal position by bearings mounted in the garage and supports a pulley 16 at one end that is connected to a pulley 18 secured above the door 12 by an endless flexible element 20. A bracket 22 secured to the door is engaged with the flexible element 20 so that as the shaft 14 is rotated in one direction, the door will be lowered and as the shaft 18 is rotated in an opposite direction, the door will be raised.

Additional pulleys 24 and 26 are secured on the shaft 14 and have cables 28 and 30 secured at one of their ends thereto. The free ends of the cables 28 and 30 support weights 32 and 34 which respectively tend to selectively urge the shaft 14 to a door raising or door closing position.

A combined guide and support structure 36 is suitably secured to one side wall of the garage 10 and includes a lower cross bar 38 and an upper U-shaped cross bar 40. The limbs of the cross bar 40 fixedly carry a horizontal guide strip 42 that parallels the web or connecting portion of cross bar 40. A pair of frame members forming bars 44 and 46 have their lower ends pivotally secured to the cross bar 38 by a pivot 48. The bar 44 extends behind the strip 42 and between the limbs of cross bar 40 whereas the bar 46 is disposed between the web of cross bar 40 and strip 42 as shown in Figure 3.

A pair of side-by-side pulleys 50 and 52 are secured on the shaft 14 and have the rear ends of cables 54 and 56 fixed thereto. The forward ends of the cables 54 and 56 are pivotally adjustably secured to the upper ends of bars 44 and 46 by turn-buckles 58 and 60.

Forward and rear ground mounted pedestals 62 and 64 are disposed in front of the garage alongside the driveway 66 leading to the garage. The pedestals 62 and 64 are similar in construction and include concrete footings 68 having the lower ends of vertical bearing tubes 70 imbedded therein. The bearing tube of pedestal 62 rotatably supports a forward post 72 and the bearing tube of pedestal 64 rotatably supports a rear post 74. Caps 76 are fitted over limiting shoulders 78 on the posts and the upper ends of the bearing tubes as shown in Figure 4.

The central parts of forward and rear horizontal rigid links 80 and 82 are suitably fixed respectively to the posts 72 and 74. Cables 84 and 86 extend between the links 80 and 82 and have their ends pivotally adjustably secured to the ends of the links 80 and 82 by turnbuckles 88 so that the posts 72 and 74 will rotate as a unit either forwardly or rearwardly. An additional horizontal link 90 is centrally fixed to the post 74 above the link 82. The ends of the link 90 are connected to turnbuckles 92 at the forward ends of cables 94 and 96. The rear ends of the cables 94 and 96 are attached to the central portions of the bars 44 and 46 to impart forward swinging movement to one of the bars as the posts 72 and 74 are rotated forwardly and forward swinging movement to the other bar as the posts 74 and 72 are rotated rearwardly.

Forward and rear, relatively perpendicular, horizontally disposed bumper engaging members 98 and 100 are fixed to the posts 72 and 74. Members 98 and 100 respectively include horizontal arms 102 and 104 having collars at their inner ends that are secured by set screws over posts 72 and 74. The outer ends of arms 102 and 104 are bent vertically upwardly and respectively support preferably rubber or resilient rollers 106 and 108 for engagement with the bumpers of vehicles.

A roller guide unit 110 is mounted on the forward wall of the garage 10 and slidably receives the cables 94, 96 which are extended rearwardly from the link 90 to the bars 44 and 46.

As is usual for overhead door structures, spring means 112 are attached at their rear ends to the rear sides of the garage and are connected adjacent the lower edge of the door 12 by cables 114 that extend over guide rollers 116 carried by the garage over the door opening. The spring members 112 coact with the counterweight shaft 14 in cushioning closing movement of the door and in aiding opening of the door.

In practical use of the present invention, when the door 12 is in its closed position, the weight 32 will be raised and the weight 34 lowered. The bumper engaging member 100 will be disposed over the driveway 66 and the bumper engaging member 98 will be swung rearwardly clear of the driveway 66. As a vehicle approaches the garage, the forward bumper of the vehicle will engage the bumper engaging member 100 to swing the same rearwardly and this action will pull the bar 46 forward in order to rotate shaft 14 to its door raising position. As the door is moved upwardly to its raised position during rearward swinging movement of the bumper engaging member 100, the bumper engaging member 98 will be moved over the driveway 66 and the cable 56 will pull the bar 46 to its rear position, this being shown in Figure 1 of the drawings.

The vehicle backs out of the garage structure 10, the rear bumper of the vehicle will engage the member 98 to swing the member 98 forwardly and as the post 74 is connected to the post 72 by the cables 84 and 86, the post 74 will be rotated forwardly to bring the member 100 over the driveway 66 and in position to be engaged by a vehicle again approaching the garage structure. When the member 98 is forced by the vehicle forwardly, the bar 46 will be pulled forwardly and will rotate shaft 14 to its door closing position and at the same time, the cable 54 will be wound upon its pulley 50 to move the bar 44 rearwardly.

What is claimed as new is as follows:

1. In an overhead garage door, a mechanism operatively connected to the door for selectively raising and lowering the same, said mechanism comprising a horizontal shaft operatively connected to the door and having counterweight means thereon for the purpose of raising the door and cushioning closing movement of the door, forward and rearwardly swingable levers operatively connected to the shaft for selectively rotating the shaft clockwise and anti-clockwise, spaced forward and rear vertical pedestals adjacent an edge of a driveway in front of the garage door, forward and rear posts rotatably supported in horizontally extending relationship on the pedestals and connected together to rotate in unison, a bumper engaging member secured to each post, the bumper engaging member on the forward post being disposed at right angles to the bumper engaging member on the rear post, and means operatively connecting the posts to the levers to swing one of the levers in opposite directions as one of the posts is rotated by a vehicle engaging and moving a first bumper engaging member, and for swinging said levers in an opposite direction as the other bumper engaging member on the other post is moved in response to a vehicle engaging the same.

2. In a garage structure including a sliding overhead door and a counterweight shaft operatively connected to the door to raise the door when the shaft is rotated in one direction and to close the door when the shaft is rotated in an opposite direction, forward and rearwardly swingable levers within the garage both of which being operatively connected to the shaft to rotate the shaft in one direction as the levers are swung forward and to rotate the shaft in an opposite direction when the levers are swung rearwardly, and forward and rear bumper engaging members operatively connected to the levers, said forward bumper engaging member being actuated by a vehicle to swing the levers in a first direction and said rear bumper engaging member being actuated to swing the levers in an opposite direction.

3. In a garage structure including a sliding overhead door and a counterweight shaft operatively connected to the door to raise the door when the shaft is rotated in one direction and to close the door when the shaft is rotated in an opposite direction, forward and rearwardly swingable levers within the garage both of which being operatively connected to the shaft to rotate the shaft in one direction as the levers are swung forward and to rotate the shaft in an opposite direction when the levers are swung rearwardly, forward and rear vertical pedestals located in front of the garage, relatively perpendicular forward and rear posts rotatably supported by the pedestals, means connecting the posts together for rotation in unison, means operatively connecting the posts to the levers to swing one of the levers in a first direction as the posts are rotated in one direction and for swinging the levers in an opposite direction as the posts are rotated in an opposite direction, and forward and rear bumper engaging members on said posts, the forward bumper engaging member adapted to be disposed in the path of a vehicle leaving the garage to be moved forwardly and cause the said levers to be swung in said first direction to rotate the shaft to a door closing position, and said rear bumper engaging member adapted to be disposed in the path of a vehicle approaching the garage to be moved rearwardly for swinging the levers in an opposite direction and thereby rotate the shaft to a door raising position.

4. The combination of claim 3 wherein said levers are mounted in a guide and support structure, and a horizontal pivot securing said levers together and to the guide and support structure.

5. The combination of claim 3 wherein said means connecting said posts comprises forward and rear horizontally disposed links centrally fixed to said forward and rear posts and a pair of flexible elements extending between and terminally fixedly attached to the ends of said links to connect the links together.

6. In a garage structure including a sliding overhead door and a counterweight shaft operatively connected to the door and selectively rotated to a door raising and door closing position to open and close the door, a guide and support structure mounted in the garage, a pair of forward and rearwardly swingable bars pivoted at their lower ends to each other and to the guide and support structure, said bars each having a forward position and a rear position, means connecting the upper end of one bar to the shaft to rotate the shaft to a door closing position as said one bar is swung to its forward position, means connecting the upper end of the other bar to the shaft to rotate the shaft to a door opening position as said other bar is moved to its forward position, said means connecting the bars to said shaft also moving one of the bars to its rear position as the other bar is moved to its forward position, and a bumper engaging means operatively connected with each bar for moving a selected bar to its forward position.

7. In a garage structure including a sliding overhead door and a counterweight shaft operatively connected to the door and selectively rotated to a door raising and door closing position to open and close the door, a guide and support structure mounted in the garage, a pair of forward and rearwardly swingable bars pivoted at their lower ends to each other and to the guide and support structure, said bars each having a forward position and a rear position, means connecting the upper end of one bar to the shaft to rotate the shaft to a door closing position as said one bar is swung to its forward position, means connecting the upper end of the other bar to the shaft to rotate the shaft to a door opening position as said other bar is moved to its forward position, said means connecting the bars to said shaft also moving one of the bars to its rear position as the other bar is moved to its forward position, forward and rear pedestals, forward and rear posts rotatably supported by the pedestals, means connecting said posts whereby the same will rotate in unison, a forward horizontally disposed bumper engaging member fixed to the forward post, a rear horizontally disposed bumper engaging member fixed to the rear post and disposed perpendicular to said forward bumper engaging member, said forward bumper engaging member adapted to be disposed in the path of a vehicle leaving the garage when the door is raised and said rear bumper engaging member adapted to be disposed in the path of a vehicle approaching the garage when the door is lowered, and means connecting the rear post to the bars whereby one of the bars will be moved to its forward position when the forward bumper engaging member is moved forwardly and whereby the other bar will be moved to its forward position as the rear bumper engaging member is moved rearwardly.

No references cited.